(12) United States Patent
Osanai et al.

(10) Patent No.: US 10,351,199 B2
(45) Date of Patent: Jul. 16, 2019

(54) WIRING STRUCTURE OF GRIP HEATER

(71) Applicant: HONDA MOTOR CO., LTD., Minato-ku, Tokyo (JP)

(72) Inventors: Takuya Osanai, Tokyo (JP); Yutaka Kikuchi, Sayama (JP)

(73) Assignee: Honda Motor Co., Ltd., Tokyo (JP)

( * ) Notice: Subject to any disclaimer, the term of this patent is extended or adjusted under 35 U.S.C. 154(b) by 93 days.

(21) Appl. No.: 15/586,350

(22) Filed: May 4, 2017

(65) Prior Publication Data

US 2017/0327172 A1 Nov. 16, 2017

(30) Foreign Application Priority Data

May 16, 2016 (JP) ................................. 2016-098162

(51) Int. Cl.
| | |
|---|---|
| *B62K 21/26* | (2006.01) |
| *B62J 33/00* | (2006.01) |
| *B60L 1/02* | (2006.01) |
| *B60R 16/03* | (2006.01) |
| *B60R 16/037* | (2006.01) |
| *B62K 23/04* | (2006.01) |
| *H05B 3/06* | (2006.01) |
| *H05B 3/42* | (2006.01) |

(52) U.S. Cl.
CPC ................ *B62J 33/00* (2013.01); *B60L 1/02* (2013.01); *B60R 16/03* (2013.01); *B60R 16/037* (2013.01); *B62K 21/26* (2013.01); *B62K 23/04* (2013.01); *H05B 3/06* (2013.01); *H05B 3/42* (2013.01)

(58) Field of Classification Search
CPC .. B62J 33/00; B62J 21/26; B62J 23/04; B60R 16/037; H05B 3/06
See application file for complete search history.

(56) References Cited

U.S. PATENT DOCUMENTS

| | | |
|---|---|---|
| 2004/0216550 A1 | 11/2004 | Fallak et al. |
| 2011/0036196 A1 | 2/2011 | Menghini |
| | (Continued) | |

FOREIGN PATENT DOCUMENTS

| | | |
|---|---|---|
| CN | 1118321 A | 3/1996 |
| CN | 1156675 A | 8/1997 |
| | (Continued) | |

OTHER PUBLICATIONS

European search report dated Oct. 13, 2017 in the corresponding European patent application No. 17168396.4.
(Continued)

*Primary Examiner* — Matthew W Jellett
(74) *Attorney, Agent, or Firm* — Carrier Blackman & Associates, P.C.; William D. Blackman; Joseph P. Carrier

(57) ABSTRACT

A wiring structure of a grip heater includes an accelerator grip, a grip pulley, an accelerator position sensor configured to detect an amount of rotation of the grip pulley, and a grip heater, an engaging section that is configured to engage the grip pulley with the accelerator position sensor and transmit the amount of rotation of the grip pulley to the accelerator position sensor is installed at the grip pulley and the accelerator position sensor, a feeder cable is connected to the grip heater, and the feeder cable is wound on an outer circumference of the engaging section.

9 Claims, 6 Drawing Sheets

(56) References Cited

U.S. PATENT DOCUMENTS

| | | | |
|---|---|---|---|
| 2011/0132128 A1* | 6/2011 | Sato | B62K 23/04 |
| | | | 74/489 |
| 2012/0061368 A1* | 3/2012 | Frigerio | B62J 33/00 |
| | | | 219/204 |
| 2013/0111983 A1 | 5/2013 | Mauch | |
| 2017/0347402 A1* | 11/2017 | Wang | B62J 33/00 |

FOREIGN PATENT DOCUMENTS

| | | |
|---|---|---|
| JP | H03-100584 U | 10/1991 |
| JP | 04-051886 U1 | 4/1992 |
| JP | 2007-076436 A | 3/2007 |
| JP | 2009-161067 A | 7/2009 |
| JP | 2015-113821 A | 6/2015 |
| JP | 2016-038290 A | 3/2016 |

OTHER PUBLICATIONS

Office Action (Notice of Allowance) with the English translation thereof, dated Oct. 31, 2017, in the corresponding Japanese patent application No. 2016-098162.

Office Action issued in the corresponding Chinese Patent Application No. 201710328922.9 with partial English translation of the Search Report, dated Dec. 28, 2018.

* cited by examiner

WIRING STRUCTURE OF GRIP HEATER

CROSS-REFERENCE TO RELATED APPLICATION

Priority is claimed on Japanese Patent Application No. 2016-098162, filed May 16, 2016, the content of which is incorporated herein by reference.

BACKGROUND

Field of the Invention

The present invention relates to a wiring structure of a grip heater.

Description of Related Art

A wiring structure of a grip heater in the related art is disclosed in, for example, Japanese Utility Model Publication No. H03-100584. This wiring structure has a structure in which a feeder cable of a grip heater extends from a portion (a bulged section) of a throttle pipe along a grip rotation direction and the feeder cable is disposed in a casing while the feeder cable is wound around a circumferential region of a guide-out section.

SUMMARY

Incidentally, Japanese Utility Model Publication No. H03-100584 does not employ an accelerator position sensor. When an accelerator position sensor is employed, an engaging section configured to engage a grip pulley with the accelerator position sensor is necessary to be provided. In this case, when a feeder cable of the grip pulley is routed to be wound around an accelerator pulley, a routing space of the feeder cable may interfere with the engaging section, and there was a possibility that the feeder cable may not be housed in a case.

An aspect of the present invention is directed to provide a wiring structure of a grip heater including an accelerator position sensor, wherein a feeder cable is housed in a case.

A wiring structure of a grip heater according to the present invention employs the following configurations.

(1) A wiring structure of a grip heater according to an aspect of the present invention includes: an accelerator grip configured to be rotatable about an axis; a grip pulley configured to rotate with the accelerator grip; an accelerator position sensor configured to detect an amount of rotation of the grip pulley; and a grip heater configured to transfer heat to the accelerator grip, wherein an engaging section that is configured to engage the grip pulley with the accelerator position sensor and transmit the amount of rotation of the grip pulley to the accelerator position sensor is installed at the grip pulley and the accelerator position sensor, a feeder cable is connected to the grip heater, and the feeder cable is wound on an outer circumference of the engaging section.

(2) In the aspect (1), the engaging section may include: a pulley-side engaging section formed at the grip pulley; and a sensor-side engaging section configured to engage with the pulley-side engaging section and formed at the accelerator position sensor, wherein any one of the pulley-side engaging section and the sensor-side engaging section may include a protruding section, and a recess section configured to engage with the protruding section may be provided at other one of the pulley-side engaging section or the sensor-side engaging section to which the protruding section is not provided, and a guide-out section configured to guide the feeder cable out may be formed at the protruding section.

(3) In the aspect (2), a case configured to accommodate the engaging section may be further provided, and a locking section configured to abut the protruding section when the engaging section is rotated to a fully opened position may be formed at the case.

(4) In the aspect (2) or (3), the engaging section may be formed in an annular shape when seen in a direction along the axis.

(5) In any one of the aspects (1) to (4), a guide section that is disposed at an outer circumferential side of the feeder cable and that is formed in an arc shape along a rotating direction of the grip pulley when seen in the direction along the axis may be further provided.

(6) In the aspect (5), the guide section may include a sidewall section that is disposed at a lateral side of the feeder cable and that is formed along a direction perpendicular to the axis.

According to the above-mentioned aspect (1), as the feeder cable is wound on the outer circumference of the engaging section, since interference between a routing space of the feeder cable and the engaging section can be avoided, the feeder cable can be housed in a case. In addition, it is possible to contribute to a size reduction of the case.

According to the above-mentioned aspect (2), as any one of the pulley-side engaging section and the sensor-side engaging section includes the protruding section, and the recess section configured to engage with the protruding section is provided at other one of the pulley-side engaging section or the sensor-side engaging section to which the protruding section is not provided, and the guide-out section configured to guide the feeder cable out is formed at the protruding section, the protruding section and the guide-out section of the feeder cable, which constitute the engaging section, can be commonly formed. For this reason, it is possible to contribute to a size reduction and a weight reduction while securing the routing space.

According to the above-mentioned aspect (3), as the locking section configured to abut the protruding section when the engaging section is rotated to the fully opened position is formed at the case, the protruding section also serves as a stopper configured to stop a rotating movement of the engaging section at the fully opened position of the accelerator grip. For this reason, it is possible to further contribute to a size reduction and a weight reduction while space saving is achieved.

According to the above-mentioned aspect (4), as the engaging section is formed in an annular shape when seen in the direction along the axis, the grip pulley and the accelerator position sensor can be engaged within a necessary minimum space. For this reason, it is possible to further contribute to a size reduction and a weight reduction.

According to the above-mentioned aspect (5), the guide section that is disposed at the outer circumferential side of the feeder cable and that is formed in the arc shape along the rotating direction of the grip pulley when seen in the direction along the axis is further provided. For this reason, the feeder cable in a loose state at the fully closed position of the accelerator grip can be guided to an appropriate position in a radial direction of the axis.

According to the above-mentioned aspect (6), the guide section is disposed at the lateral side of the feeder cable and includes the sidewall section formed along the direction perpendicular to the axis. For this reason, the feeder cable in a loose state at the fully closed position of the accelerator grip can be guided to an appropriate position in the direction along the axis.

DESCRIPTION OF EMBODIMENTS

Figure 1:
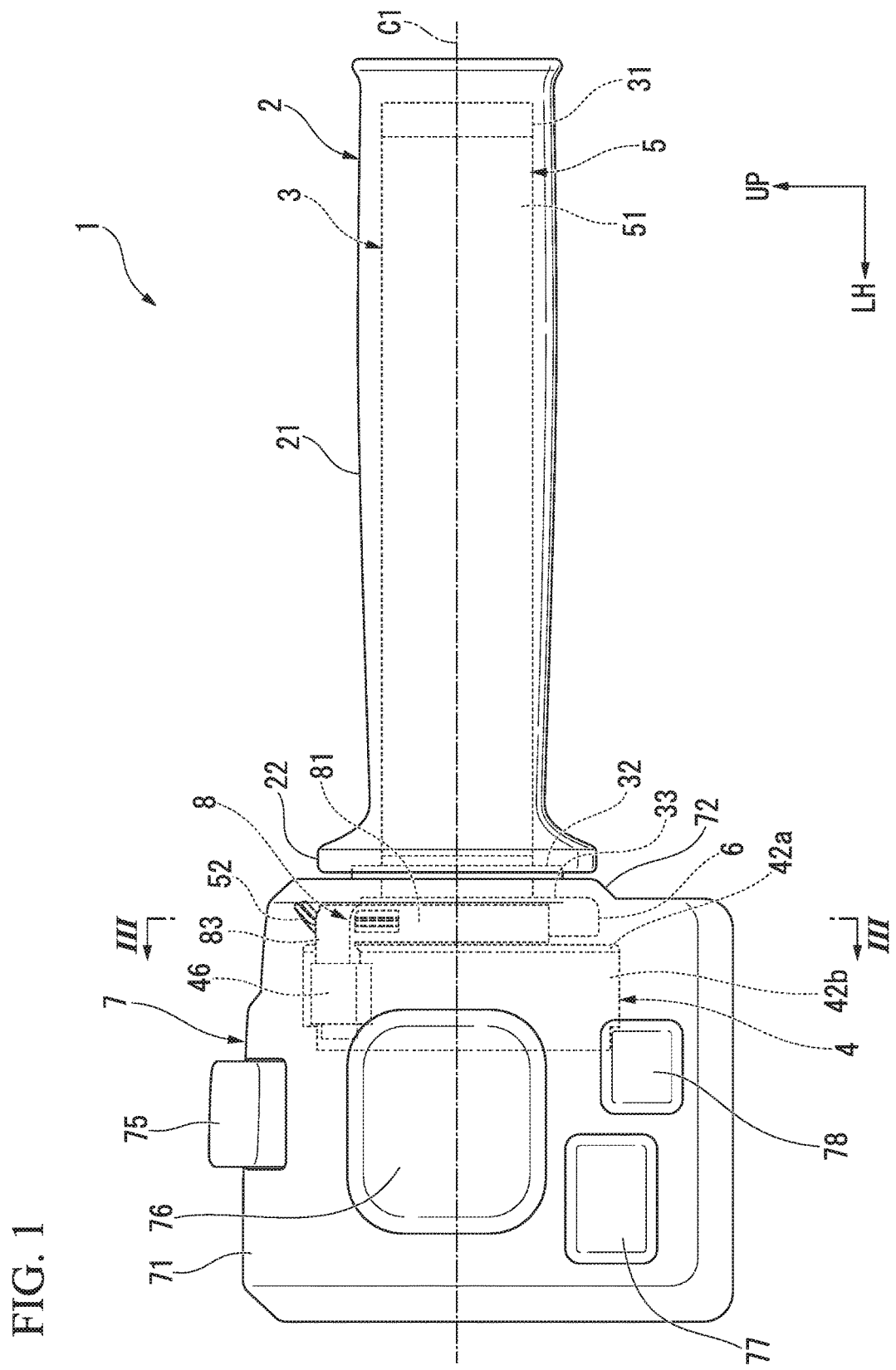
FIG. 1 is a front view of a wiring structure of a grip heater according to an embodiment.
Figure 2:
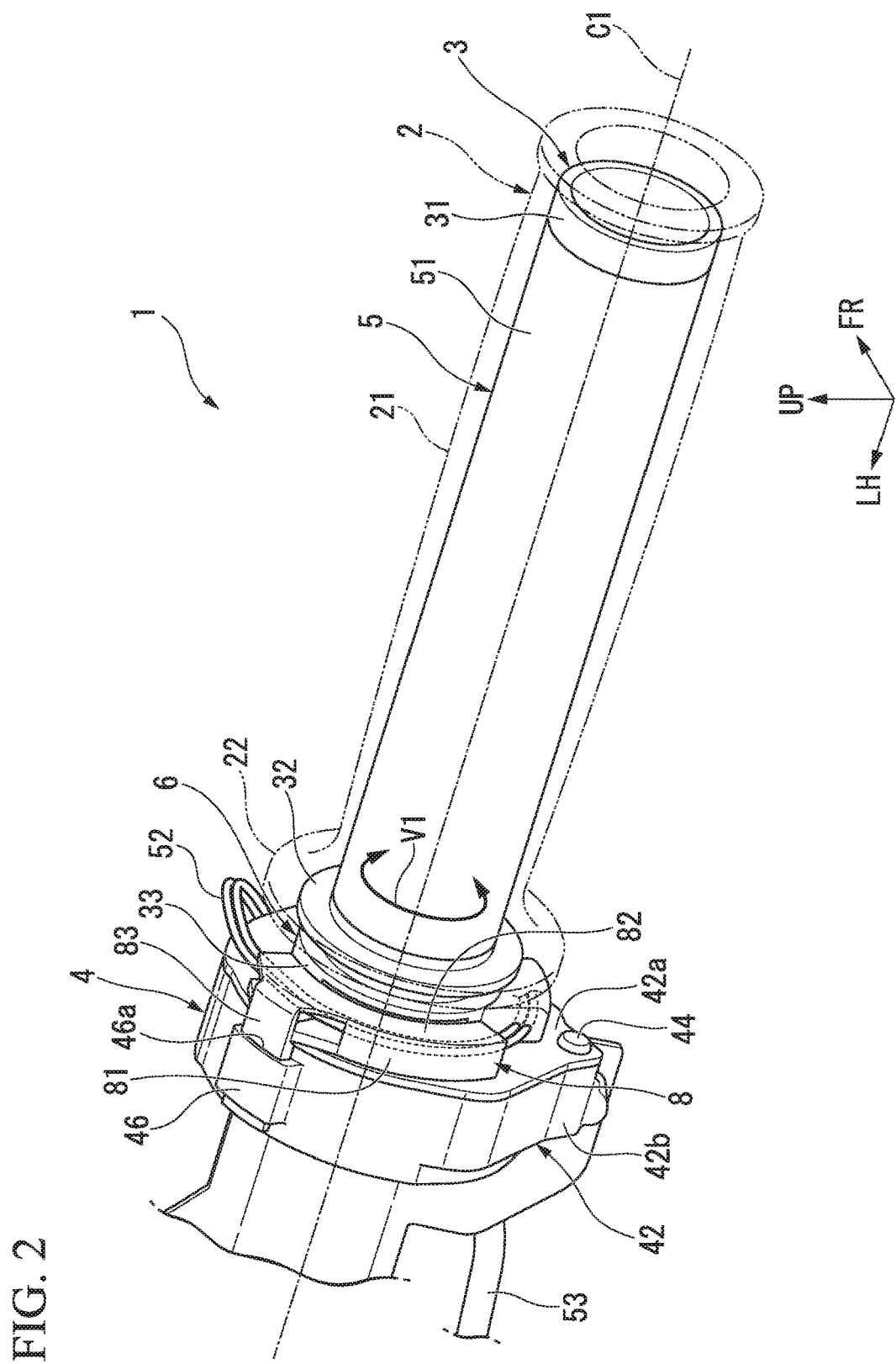
FIG. 2 is a perspective view of the wiring structure of a grip heater according to the embodiment.

Hereinafter, an embodiment of the present invention will be described with reference to the accompanying drawings. Further, directions of forward, rearward, leftward, rightward, and the like described below are the same as directions of a motorcycle (not shown, hereinafter, referred to as a "vehicle") described below unless the context clearly indicates otherwise. In addition, in appropriate places in the drawings used in the following description, an arrow FR showing a forward direction with respect to a vehicle, an arrow LH showing a leftward direction with respect to the vehicle, and an arrow UP showing an upward direction with respect to the vehicle are provided.
<Wiring Structure of Grip Heater>
FIG. 1 shows a wiring structure 1 of a grip heater at a right side of a vehicle installed at a right portion of a handle pipe (a bar handle), which is not shown, as an example of a wiring structure of a grip heater.
The present invention will be described with reference to FIG. 1 and FIG. 2 together. The wiring structure 1 of a grip heater includes an accelerator grip 2 that is rotatable about an axis C1, a grip pulley 3 that rotates with the accelerator grip 2, an accelerator position sensor 4 configured to detect an amount of a rotation of the grip pulley 3, a grip heater 5 configured to transfer heat to the accelerator grip 2, a case 7 configured to accommodate the accelerator position sensor 4, an engaging section 6, or the like (to be described below), and a guide section 8 configured to guide a feeder cable 52 (to be described below).
Further, in FIG. 2, illustration of the case 7 and the like will be omitted. For convenience of description, the axis C1 in the drawings coincides with a straight line extending in a vehicle width direction. Hereinafter, a direction along the axis C1 is referred to as "an axial direction," the inner vehicle width direction side in the axial direction is referred to as "the inner axial direction side," and the outer vehicle direction side in the axial direction is referred to as "the outer axial direction side."
<Accelerator Grip>
As shown in FIG. 1, the accelerator grip 2 is formed in a tubular shape along the axis C1. For example, the accelerator grip 2 is formed of rubber.
The accelerator grip 2 includes a tubular grip main body 21 along the axis C1 and a grip flange 22 connected to an inner end portion of the grip main body 21 in the axial direction.

The grip main body 21 swells slightly outward in a radial direction as it gets closer to a central position in the axial direction (specifically, a position at a slightly right side thereof).
The grip flange 22 is formed in an annular shape having a thickness in the axial direction and having a wider diameter in the radial direction as it gets closer to the inner axial direction side.
<Grip Pulley>
The grip pulley 3 is formed in a tubular shape along the axis C1. For example, the grip pulley 3 is formed of a resin.
The grip pulley 3 includes a tubular pulley main body 31 that is taken along the axis C1, a pulley flange 32 connected to an inner end portion of the pulley main body 31 in the axial direction, and a pulley-side engaging section 33 (to be described below).
The pulley main body 31 is formed in a cylindrical shape having an outer shape that has a smaller diameter than the grip main body 21. The pulley flange 32 is formed in an annular shape having an outer shape having a thickness in the axial direction and a smaller diameter than the grip flange 22.
For example, the grip main body 21 is press-fitted onto an outer circumference of the pulley main body 31. Accordingly, the grip pulley 3 is arranged to rotate with the accelerator grip 2.
The grip flange 22 abuts the pulley flange 32 from the outer axial direction side. That is, the pulley flange 32 restricts a position of an inner end portion of the accelerator grip 2 in the axial direction.
<Accelerator Position Sensor>
The accelerator position sensor 4 has an outer shape larger than the grip flange 22 when seen in the axial direction. For example, a magnetic sensor (for example, a Hall IC), which is not shown, that can detect a rotation amount and a rotation speed of the grip pulley 3 is incorporated in the accelerator position sensor 4.
The accelerator position sensor 4 will be described with reference to FIG. 2, FIG. 3, and FIG. 5 together. The accelerator position sensor 4 includes a sensor main body 41, a sensor accommodating section 42 configured to accommodate the sensor main body 41, and a sensor-side engaging section 43, which will be described below.
The sensor main body 41 is arranged rotatable about the axis C1. On the other hand, the sensor accommodating section 42 is arranged not to be rotatable about the axis C1.
The sensor accommodating section 42 is fixed inside the case 7. The sensor accommodating section 42 covers the sensor main body 41 such that the sensor main body 41 is rotatable about the axis C1.
The sensor accommodating section 42 includes an annular-shaped first accommodating wall 42a configured to cover an outside of the sensor main body 41 in the axial direction side and having a thickness in the axial direction, a tubular shaped second accommodating wall 42b configured to cover an outside of the sensor main body 41 in the radial direction, a third accommodating wall 42c continuous to the second accommodating wall 42b and configured to cover an inner side of the sensor main body 41 in the axial direction, and a tubular shaped fourth accommodating wall 42d configured to cover an inner radial direction side of the sensor main body 41.
The first accommodating wall 42a is fixed to the second accommodating wall 42b at a plurality of places (for example, three places in the embodiment). For example, the first accommodating wall 42a is fixed to the second accommodating wall 42b by a fastener 44 such as a screw or the like (see FIG. 3).

A swelling section 46 swelled outward in the radial direction is formed at the second accommodating wall 42b. An insertion hole 46a opened substantially parallel to the axial direction is formed in the swelling section 46.

<Grip Heater>

The grip heater 5 will be described with reference to FIG. 1 and FIG. 2 together. The grip heater 5 is disposed inside the accelerator grip 2 in the radial direction.

The grip heater 5 includes a heater main body 51 serving as a heat generating part, and a rubber member (not shown) configured to cover the heater main body 51.

The feeder cable 52 which is formed in a linear shape and configured to supply current to the heater main body 51 is connected to the heater main body 51.

The feeder cable 52 extends in a state in which the feeder cable 52 is sufficiently loose in order not to interfere with a rotational operation of the accelerator grip 2. The feeder cable 52 is wound around the engaging section 6, which will be described below.

<Engaging Section>

The engaging section 6 will be described with reference to FIG. 2 and FIG. 3 together. The engaging section 6 which is configured to engage the grip pulley 3 with the accelerator position sensor 4 is installed at the grip pulley 3 and the accelerator position sensor 4.

The engaging section 6 is configured to transmit an amount of rotation of the grip pulley 3 to the accelerator position sensor 4. The engaging section 6 includes the pulley-side engaging section 33 provided at the grip pulley 3, and the sensor-side engaging section 43 provided at the accelerator position sensor 4. The engaging section 6 is formed in an annular shape when seen in the axial direction.

Further, reference numeral V1 in the drawings designates a rotating direction of the grip pulley 3. Hereinafter, the rotating direction V1 of the grip pulley 3 may be simply referred to as "the rotating direction." In the embodiment, the rotating direction V1 coincides with a circumferential direction of the grip pulley 3.

<Pulley-Side Engaging Section>

The pulley-side engaging section 33 is disposed further in the inner axial direction side than the pulley flange 32, and is connected to the inner end portion of the pulley main body 31 in the axial direction. The pulley-side engaging section 33 includes a protruding section 61 protruding inward in the axial direction.

The protruding section 61 includes a first protruding section 62 and a second protruding section 63, which are disposed at an interval in the rotating direction V1. The first protruding section 62 and the second protruding section 63 are disposed so that inner side surfaces thereof in the radial direction are opposed to one another, while having the axis C1 interposed therebetween. When seen in the axial direction, the first protruding section 62 is formed in an arc shape along the rotating direction V1.

The second protruding section 63 includes a second protruding section main body 63a formed in an arc shape along the rotating direction V1 when seen in the axial direction, and a protrusion 63b protruding outward from the second protruding section main body 63a in the radial direction.

When seen in the axial direction, the protrusion 63b includes a first surface 63f formed along a straight line perpendicular to the axis C1, a second surface 63g that is disposed at an opposite side of the first surface 63f in the rotating direction V1 and that is substantially parallel with the first surface 63f, and a third surface 63h continuous to the first surface 63f and the second surface 63g and formed in an arc shape along the rotating direction V1.

A guide-out section 64 configured to guide the feeder cable 52 out is formed at the protrusion 63b. For example, the guide-out section 64 is a through-hole opened to enable the feeder cable 52 to be inserted thereto and extending along the feeder cable 52.

<Sensor-Side Engaging Section>

Figure 5:
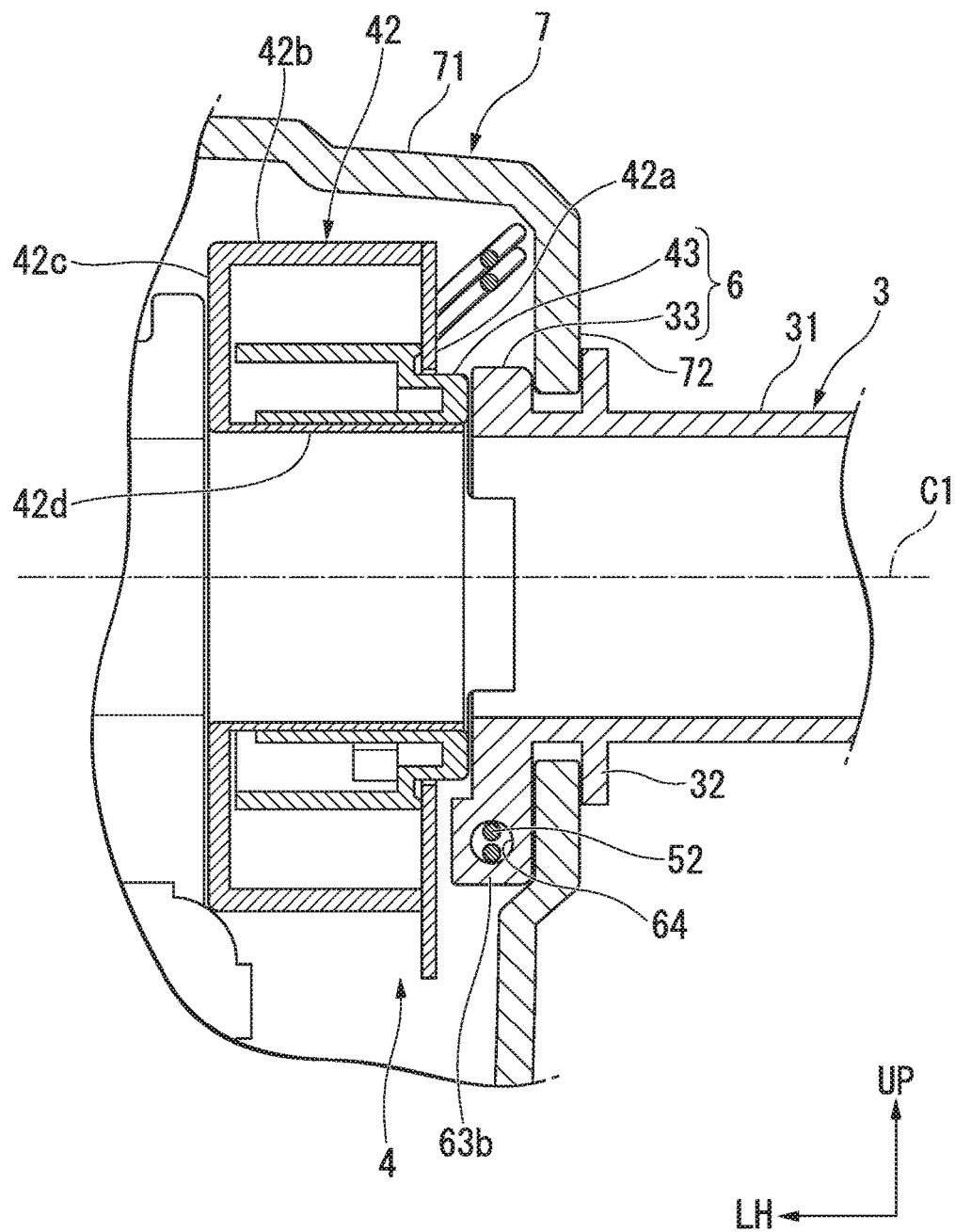
FIG. 5 is a view including a cross section V-V of FIG. 3.

The sensor-side engaging section 43 will be described with reference to FIG. 3 and FIG. 5 together. The sensor-side engaging section 43 is disposed at an outer side of the accelerator position sensor 4 in the axial direction and is connected to the sensor main body 41. The sensor-side engaging section 43 includes a recess section 65 recessed inward in the axial direction.

The recess section 65 includes a first recess section 66 and a second recess section 67, which are disposed with an interval to each other in the rotating direction V1. When seen in the axial direction, the first recess section 66 and the second recess section 67 are respectively disposed at positions overlapping the first protruding section 62 and the second protruding section 63. That is, the first recess section 66 is configured to engage with the first protruding section 62, and the second recess section 67 is configured to engage with the second protruding section 63. Accordingly, the sensor main body 41 is formed to be rotated together with the grip pulley 3.

<Case>

The case 7 will be described with reference to FIG. 1, FIG. 3, and FIG. 5 together. The case 7 has a larger outer shape than the accelerator position sensor 4 when seen in the axial direction. The case 7 includes a case main body 71 that constitutes an outer shell section of the case 7, a pulley holding section 72 disposed at an outer end portion of the case main body 71 in the axial direction and configured to rotationally hold the grip pulley 3, and a locking section 73 protruding inward from an inner wall of the case main body 71 in the radial direction.

Various switches 75, 76, 77, and 78 are installed at the case main body 71.

The pulley holding section 72 is disposed between the pulley flange 32 and the pulley-side engaging section 33 in the axial direction.

<Locking Section>

The locking section 73 will be described with reference to FIG. 3 and FIG. 4 together. When seen in the axial direction, the locking section 73 protrudes rearward from a front inner wall of the case main body 71 toward the engaging section 6. When seen in the axial direction, the locking section 73 includes a first edge portion 73f along a straight line perpendicular to the axis C1 (specifically, a horizontal line passing through the axis C1), a second edge portion 73g that is disposed at an opposite side of the first edge portion 73f in the rotating direction V1 (specifically, above the first edge portion 73f) and that is substantially parallel with the first edge portion 73f, and a third edge portion 73h which forms an arc shape along the rotating direction V1 and along an outer shape of the engaging section 6.

Figure 3:
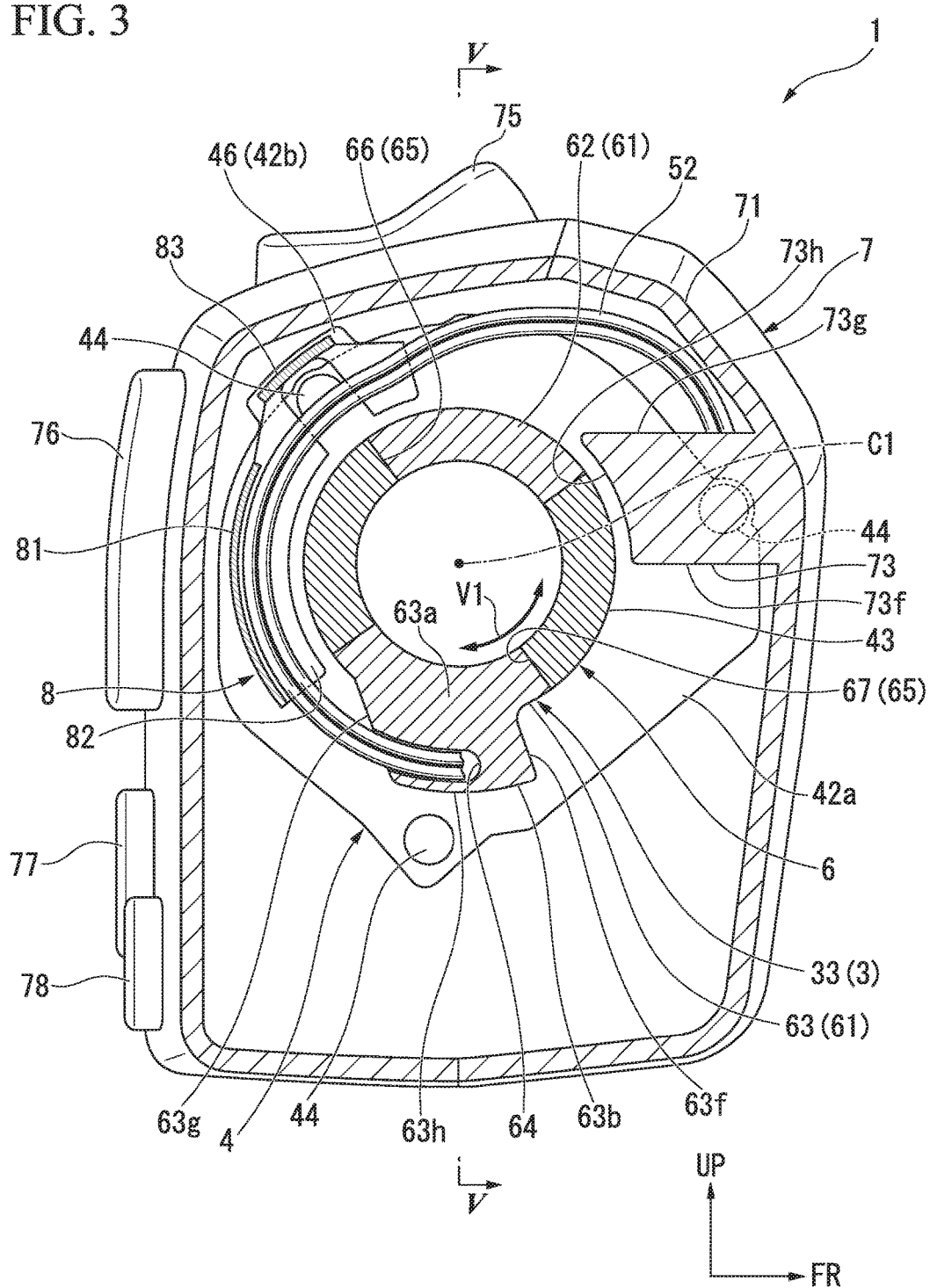
FIG. 3 is a view including a cross section III-III of FIG. 1, and showing a fully closed position of an accelerator grip.

As shown in FIG. 3, the protrusion 63b is directed downward at a fully closed position of the accelerator grip 2 (hereinafter, simply referred to as "the fully closed position").

Figure 4:
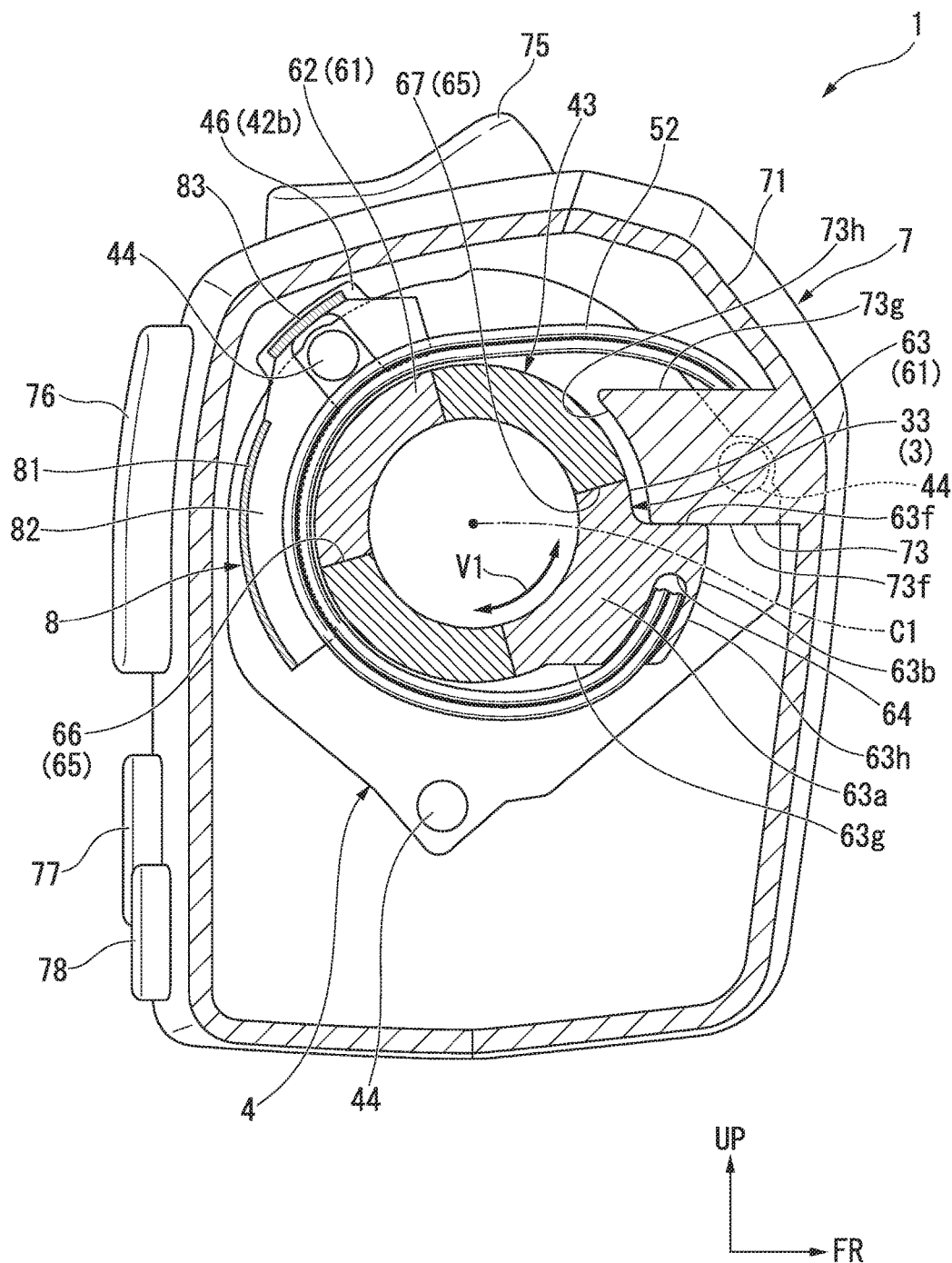
FIG. 4 is a view including a cross section corresponding to FIG. 3, and showing a fully opened position of the accelerator grip.

Meanwhile, as shown in FIG. 4, the protrusion 63b is directed forward at a fully opened position of the accelerator grip 2 (hereinafter, simply referred to as "the fully opened position").

The locking section 73 abuts the protrusion 63b when the engaging section 6 is rotated to the fully opened position. That is, when the engaging section 6 is rotated to the fully opened position, the first surface 63f of the protrusion 63b and the first edge portion 73f of the locking section 73 abut with each other.

<Guide Section>

The guide section 8 will be described with reference to FIG. 2 and FIG. 3 together. The guide section 8 is operatively attached to the grip pulley, and is disposed at an outer circumferential side of the feeder cable 52.

When seen in the axial direction, the guide section 8 is formed in an arc shape along the rotating direction V1.

The guide section 8 includes a circumferential wall section 81 that is disposed at the outer circumferential side of the feeder cable 52 and that is formed in an arc shape when seen in the axial direction, a sidewall section 82 that is disposed at a lateral side of the feeder cable 52 and that is formed along a direction perpendicular to the axis C1, and a locking piece 83 that is locked to the second accommodating wall 42b of the accelerator position sensor 4 and that is extending substantially parallel with the axial direction.

For example, the guide section 8 is fixed by the locking piece 83 being inserted into the insertion hole 46a of the swelling section 46.

The feeder cable 52 approaches the circumferential wall section 81 and extends along the rotating direction V1 after being guided out from the guide-out section 64 at the fully closed position shown in FIG. 3. The feeder cable 52 is extended in a state in which the feeder cable 52 is sufficiently loose at the fully closed position.

Meanwhile, the feeder cable 52 approaches the engaging section 6 and extends along the rotating direction V1 after being guided out from the guide-out section 64 at the fully opened position shown in FIG. 4. The feeder cable 52 extends in a state in which the feeder cable 52 is less loose at the fully opened position than at the fully closed position because the feeder cable 52 is pulled by a rotation operation of the accelerator grip 2 at the fully opened position.

<Holding Frame Section>

Figure 6:
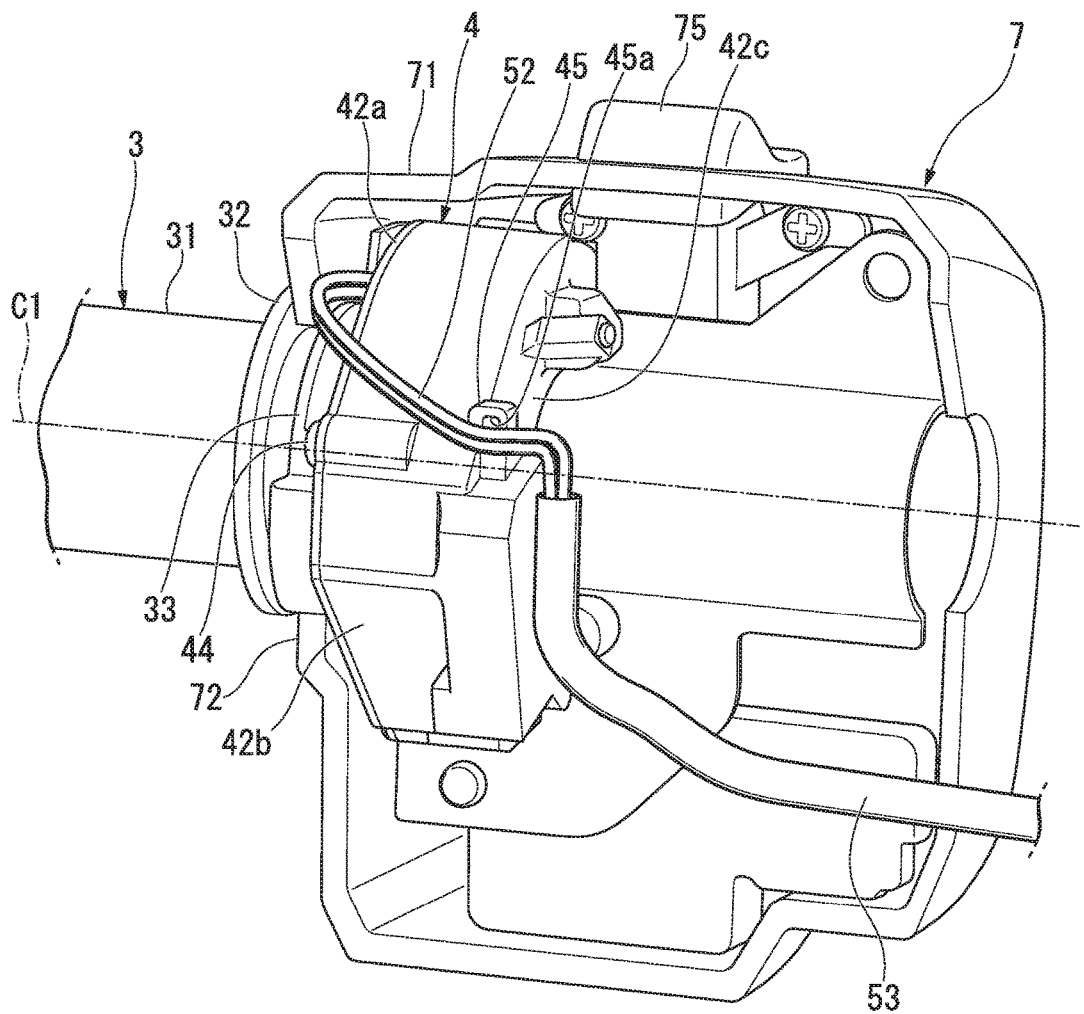
FIG. 6 is a perspective view showing a routing state of a feeder cable.

As shown in FIG. 6, a holding frame section 45 having a frame shape and configured to hold the feeder cable 52 is installed at a connecting section (a boundary section) of the second accommodating wall 42b and the third accommodating wall 42c in the accelerator position sensor 4. For example, in a state in which the feeder cable 52 is disposed at a position adjacent to the holding frame section 45, as a clamping band (not shown) is inserted through an insertion hole 45a of the holding frame section 45 and the feeder cable 52 is bound by the clamping band, the feeder cable 52 can be held by the holding frame section 45 via the clamping band.

Further, the feeder cable 52 extends toward a vehicle body to be connected to a power supply unit (not shown) after being held by the holding frame section 45. Reference numeral 53 in the drawings designates a tubular protective tube having flexibility and configured to cover the feeder cable 52.

As described above, the wiring structure 1 of a grip heater of the embodiment includes the accelerator grip 2 configured to be rotatable about the axis C1, the grip pulley 3 configure to rotate with the accelerator grip 2, the accelerator position sensor 4 configured to detect an amount of rotation of the grip pulley 3, and the grip heater 5 configured to transfer heat to the accelerator grip 2, the engaging section 6 configured to engage the grip pulley 3 with the accelerator position sensor 4 and transmit the amount of rotation of the grip pulley 3 to the accelerator position sensor 4 is installed at the grip pulley 3 and the accelerator position sensor 4, the feeder cable 52 is connected to the grip heater 5, and the feeder cable 52 is wound on the outer circumference of the engaging section 6.

According to the above-mentioned configuration, as the feeder cable 52 is wound on the outer circumference of the engaging section 6, since interference between a routing space of the feeder cable 52 and the engaging section 6 can be avoided, the feeder cable 52 can be housed in the case 7. In addition, it is possible to contribute to a size reduction of the case 7.

In addition, in the embodiment, the pulley-side engaging section 33 includes the protruding section 61, the sensor-side engaging section 43 includes the recess section 65 engages with the protruding section 61, and the guide-out section 64 configured to guide the feeder cable 52 out is formed at the protruding section 61. For this reason, since the protruding section 61 and the guide-out section 64 of the feeder cable 52, which constitute the engaging section 6, can be commonly formed, it is possible to contribute to a size reduction and a weight reduction.

In addition, in the embodiment, as the locking section 73 configured to abut the protruding section 61 when the engaging section 6 is rotated to the fully opening position is formed at the case 7, the protruding section 61 also serves as a stopper configured to stop pivotal movement of the engaging section 6 at the fully opening position of the accelerator grip 2. For this reason, it is possible to further contribute to reduction in size and reduction in weight.

In addition, in the embodiment, the engaging section 6 is formed in an annular shape when seen in a direction along the axis C1. For this reason, since the grip pulley 3 and the accelerator position sensor 4 can be engaged within a necessary minimum space, it is possible to further contribute to a size reduction and a weight reduction.

In addition, in the embodiment, the guide section 8 that is disposed at the outer circumferential side of the feeder cable 52 and that is formed in an arc shape along the rotating direction V1 of the grip pulley 3 when seen in the direction along the axis C1 is further provided. For this reason, the feeder cable 52 can be guided to an appropriate position in the radial direction of the axis C1 in a state in which the feeder cable 52 is loose at the fully closed position of the accelerator grip 2.

In addition, in the embodiment, the guide section 8 includes the sidewall section 82 disposed at a lateral side of the feeder cable 52 and formed along the direction perpendicular to the axis C1. For this reason, the feeder cable 52 can be guided to an appropriate position in the direction along the axis C1 in a state in which the feeder cable 52 is loose at the fully closed position of the accelerator grip 2.

Further, in the embodiment, while an example in which the pulley-side engaging section includes the protruding section and the sensor-side engaging section includes the recess section configured to engage with the protruding section has been exemplarily described, the embodiment is not limited thereto.

For example, the sensor-side engaging section may include the protruding section and the pulley-side engaging section may include the recess section configured to engage with the protruding section. That is, any one of the pulley-side engaging section and the sensor-side engaging section may include the protruding section, and the recess section configured to engage with the protruding section may be provided at other one of the pulley-side engaging section (33) or the sensor-side engaging section (43) to which the protruding section (61) is not provided.

In addition, in the embodiment, an example in which the pulley-side engaging section includes the first protruding section and the second protruding section, which protrude inward in the axial direction, and the sensor-side engaging section includes the first recess section and the second recess section, which are recessed inward in the axial direction (i.e., the example in which the pulley-side engaging section includes two protruding sections and the sensor-side engaging section includes two recess sections) has been exemplarily described, the embodiment is not limited thereto.

For example, the pulley-side engaging section may include three or more protruding sections, and the sensor-side engaging section may include three or more recess sections. That is, the numbers of the protruding sections and the recess sections may be arbitrarily set according to design specification.

Further, the present invention is not limited to the above-mentioned embodiment, but for example, all vehicles on which a driver rides on a vehicle body are included as the vehicle, and in addition to a motorcycle (including a motorized bicycle and a scooter type vehicle), a three-wheeled vehicle (including a two-front-wheeled and one-rear-wheeled vehicle in addition to a one-front-wheeled and two-rear-wheeled vehicle) may also be included. In addition, the present invention may also be applied to a four-wheeled vehicle such as an automobile in addition to a motorcycle.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A wiring structure of a grip heater comprising:
   an accelerator grip configured to be rotatable about an axis;
   a grip pulley configured to rotate with the accelerator grip;
   an accelerator position sensor configured to detect an amount of rotation of the grip pulley; and
   a grip heater configured to transfer heat to the accelerator grip,
   wherein an engaging section, that is configured to engage the grip pulley with the accelerator position sensor and to transmit the amount of rotation of the grip pulley to the accelerator position sensor, is installed at the grip pulley and the accelerator position sensor,
   a feeder cable is connected to the grip heater, and
   the feeder cable is wound on an outer circumference of the engaging section.

2. The wiring structure of a grip heater according to claim 1, wherein the engaging section comprises:
   a pulley-side engaging section formed at the grip pulley; and
   a sensor-side engaging section configured to engage with the pulley-side engaging section and formed at the accelerator position sensor,
   wherein a first one of the pulley-side engaging section and the sensor-side engaging section comprises a protruding section, and a second one of the pulley-side engaging section and the sensor-side engaging section comprises a recess section configured to engage with the protruding section,
   and wherein a guide-out section, configured to guide the feeder cable out, is formed at the protruding section.

3. The wiring structure of a grip heater according to claim 2, further comprising:
   a case configured to accommodate the engaging section,
   wherein a locking section configured to abut the protruding section when the engaging section is rotated to a fully opened position is formed at the case.

4. The wiring structure of a grip heater according to claim 2,
   wherein the engaging section is formed in an annular shape when seen in a direction along the axis.

5. The wiring structure of a grip heater according to claim 1, further comprising:
   a guide section that is disposed at an outer circumferential side of the feeder cable and that is formed in an arc shape along a rotating direction of the grip pulley when seen in the direction along the axis.

6. The wiring structure of a grip heater according to claim 5, wherein the guide section comprises a sidewall section that is disposed at a lateral side of the feeder cable and that is formed along a direction perpendicular to the axis.

7. The wiring structure of a grip heater according to claim 2, wherein the protruding section comprises a main protrusion body protruding in an axial direction and having an arc shape along a rotating direction of the grip pulley, and wherein the guide-out section is a through-hole formed in the protruding section and configured to receive the feeder cable therein.

8. The wiring structure of a grip heater according to claim 5, wherein the guide section is operatively attached to the grip pulley, is configured to guide the feeder cable, and comprises:
   a circumferential wall section disposed at an outer circumferential side of the feeder cable;
   a sidewall section disposed at a lateral side of the feeder cable and formed along a direction perpendicular to the axis; and
   a locking piece that interconnects a main body of the accelerator position sensor and the grip pulley, whereby the main body of the accelerator position sensor is configured to be rotated together with the grip pulley.

9. The wiring structure of a grip heater according to claim 7, wherein the guide section is operatively attached to the grip pulley, is configured to guide the feeder cable, and comprises:
   a circumferential wall section disposed at an outer circumferential side of the feeder cable;
   a sidewall section disposed at a lateral side of the feeder cable and formed along a direction perpendicular to the axis; and
   a locking piece that interconnects a main body of the accelerator position sensor and the grip pulley, whereby the main body of the accelerator position sensor is configured to be rotated together with the grip pulley.

* * * * *